(12) United States Patent
Takeuchi et al.

(10) Patent No.: US 8,685,362 B2
(45) Date of Patent: Apr. 1, 2014

(54) METHOD FOR PRODUCING ANODE FOR LITHIUM SECONDARY BATTERY AND ANODE COMPOSITION, AND LITHIUM SECONDARY BATTERY

(75) Inventors: Masataka Takeuchi, Kanagawa (JP); Chiaki Sotowa, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/180,608

(22) Filed: Jul. 12, 2011

(65) Prior Publication Data

US 2011/0269016 A1 Nov. 3, 2011

Related U.S. Application Data

(62) Division of application No. 11/994,520, filed as application No. PCT/JP2006/313630 on Jul. 3, 2006, now Pat. No. 8,003,257.

(60) Provisional application No. 60/697,960, filed on Jul. 12, 2005.

(30) Foreign Application Priority Data

Jul. 4, 2005 (JP) .................................. 2005-194672

(51) Int. Cl.
*D01F 9/12* (2006.01)

(52) U.S. Cl.
USPC ..................... 423/447.2; 423/447.1; 252/510; 252/511; 977/742

(58) Field of Classification Search
USPC ............ 252/502, 510, 511; 423/447.1, 447.2; 977/742
See application file for complete search history.

(56) References Cited

U.S. PATENT DOCUMENTS

| 2003/0049443 A1 | 3/2003 | Nishimura et al. |
| 2004/0248010 A1 | 12/2004 | Kato et al. |

FOREIGN PATENT DOCUMENTS

| JP | 09-027315 A | 1/1997 |
| JP | 10-027601 A | 1/1998 |
| JP | 11-176442 A | 7/1999 |
| JP | 11176442 A * | 7/1999 |
| JP | 2000-133267 A | 5/2000 |

(Continued)

OTHER PUBLICATIONS

Emmenegger et al. Investigation of electrochemical double-layer (ECDL) capacitors electrodes based on carbon nanotubes and activated carbon materials. Journal of Power Sources 124 (2003). 321-329.*

(Continued)

*Primary Examiner* — Stanley Silverman
*Assistant Examiner* — Richard M Rump
(74) *Attorney, Agent, or Firm* — Sughrue Mion, PLLC

(57) ABSTRACT

The invention relates to an anode for lithium secondary battery comprising vapor grown carbon fiber uniformly dispersed without forming an agglomerate of 10 μm or larger in an anode active material using natural graphite or artificial graphite, which anode is excellent in long cycle life and large current characteristics. Composition used for production for the anode can be produced, for example, by mixing a thickening agent solution containing an anode active material, a thickening agent aqueous solution and styrene butadiene rubber as binder with a composition containing carbon fiber dispersed in a thickening agent with a predetermined viscosity or by mixing an anode active material with vapor grown carbon fiber in dry state and then adding polyvinylidene difluoride thereto.

8 Claims, 4 Drawing Sheets

(56) References Cited

FOREIGN PATENT DOCUMENTS

| JP | 2002-164052 A | 6/2002 |
|----|---------------|--------|
| JP | 2004-003097 A | 1/2004 |
| JP | 2004-250275 A | 9/2004 |
| JP | 2004-362777 A | 12/2004 |
| JP | 2005-004974 A | 1/2005 |
| JP | 2005-222993 A | 8/2005 |

OTHER PUBLICATIONS

Emmenegger et al. Synthesis of carbon nanotubes over Fe catalyst on aluminium and suggested growth mechanism. Carbon 41 (2003). 539-547.*

Jin-Hyon Lee, Sangkyu Lee, Ungyu Paik, Young-Min Choi, Aqueous processing of natural graphite particulates for lithium-ion battery anodes and their electrochemical performance, Journal of Power Sources, vol. 147, Issues 1-2, Sep. 9, 2005, pp. 249-255, ISSN 0378-7753, 10.1016/j.jpowsour.2005.01.022. (http://www.sciencedirect.com/science/arti.*

Pinho, F.T. "Flow of Non-Newtonian Fluids in a Pipe". J. Non-Newtonian Fluid Mechanics. 34 (1990) 129-144.*

Qian-ming Gong, Zhi Li, Xiao-dong Bai, Dan Li, Yun Zhao, Ji Liang, Thermal properties of aligned carbon nanotube/carbon nanocomposites, Materials Science and Engineering: A, vol. 384, Issues 1-2, Oct. 25, 2004, pp. 209-214, ISSN 0921-5093, 10.1016/j.msea.2004.06.006. (http://www.sciencedirect.com/science/article/pii/S092150930400810X).*

JP 11176442 A Machine English Translation.*

* cited by examiner

METHOD FOR PRODUCING ANODE FOR LITHIUM SECONDARY BATTERY AND ANODE COMPOSITION, AND LITHIUM SECONDARY BATTERY

CROSS-REFERENCE TO RELATED APPLICATION

This application is a Divisional of pending prior application Ser. No. 11/994,520 filed Jan. 3, 2008, which is a 371 application of PCT/JP2006/313630 filed Jul. 3, 2006, which claims benefit of priority from U.S. Provisional Application No. 60/697,960 filed Jul. 12, 2005 under the provision of 35 U.S.C. Section 111(b), pursuant to 35 U.S.C. Section 119(e) (1). The entire disclosures of the prior applications are incorporated by reference herein.

TECHNICAL FIELD

The present invention relates to a lithium secondary battery excellent in cycle life and large-current characteristics, which comprises in anode, anode active material which is graphite material using natural graphite or artificial graphite and carbon fiber having a good electroconductivity.

BACKGROUND ART

As reduction in size and weight of mobile devices with higher performance proceeds, there are increasing demands for higher capacity and longer cycle life of secondary battery. With this in the background, as a second battery for small portable appliances such as cellular phones and video cameras, lithium secondary batteries such as cylindrical or prismatic lithium ion battery using non-aqueous electrolyte solution and lithium polymer battery, because of their high energy density and high voltage characteristics, have been widely used in many appliances.

As cathode active material used in these lithium secondary batteries, metal oxide compounds such as lithium cobaltate having a high charge-discharge capacity per unit at a high potential are used and as anode active material, carbon materials such as graphite which has a high charge-discharge capacity per unit near that of lithium at a low potential are used.

Conventionally, as anode material, natural graphite, artificial graphite, low-crystalline carbon material, noncrystalline carbon material, surface-coated carbon material, mesophase pitch carbon fiber, carbon material doped with other elements such as boron and the like material have been used so far.

Initially, natural graphite drew attention for its ability to achieve high battery capacity, however, due to the critical problem of its short cycle life caused by strong decomposition reaction of electrolyte solution, practical application of natural graphite was difficult.

On the other hand, artificial graphite which can be obtained by thermal treatment using as raw material coke or the like has relatively good cycle characteristics and therefore, it is being widely used as anode active material.

With a view to obtaining an anode active material with a higher battery capacity and a longer cycle life, studies are being vigorously continued at the present day. For example, those granulated or processed into a spherical shape by subjecting highly-crystalline graphitic material to machinery treatment have been proposed, and studies on anode active materials whose surface is coated with pitch or resin and thermally treated to thereby control surface reactivity are being made.

On the other hand, for maintenance and enhancement in electroconductivity between anode active materials, addition of electroconductive carbon material such as carbon black, graphite fine powder, carbon fiber or vapor grown carbon fiber is effective. Especially, vapor grown carbon fiber, which is a fine fibrous substance, is effective for formation of conductive paths between active materials and in a case where a large current is passed, since vapor grown carbon fiber can reduce electric resistance of electrode, it has been assumed that use of vapor grown carbon fiber is advantageous to produce a large energy. Moreover, in terms of charge-discharge cycle life, it can be assumed that, thanks to its fibrousness, even when active material itself swells or shrinks, the conductive paths can be maintained and therefore, studies have also been made with a view to improvement in cycle life.

Japanese Patent No. 3033175 describes that addition of less than 5% by weight of vapor grown carbon fiber has no effects of enhancing cycle life. However, too large an amount of vapor grown carbon fiber causes significant deterioration of coatability. Further, the more vapor grown carbon fiber is added, the smaller the proportion of the active material accounting for, resulting in decrease in battery capacity and therefore, it is necessary to obtain an effect with a smaller amount of vapor grown carbon fiber.

In Japanese Patent Application Laid-Open No. 2000-133267, cycle life is improved by adding from 0.5 to 22.5 parts by mass of vapor grown carbon fiber. The document describes a technical feature that in the electrode, secondary particles comprising vapor grown carbon fiber having an average particle size of 12 to 48 μm are contained. However, in an electrode having such a condition, no enhancement in cycle life characteristics was observed (Comparative Example 7). The reason can be assumed to be that when vapor grown carbon fiber is localized, electric current converges onto the secondary particles, resulting in concentrated deterioration of the portion. Thus, further improvement is required.

Recently, with an aim to improve large-current characteristics and cycle life, a material which comprises carbon fiber grown directly from a surface of an anode active material has been reported. (Japanese Patent Application Laid-Open No. 2004-250275). Its effects include improvement in large-current characteristics. However, given that the discharge capacity over 5-hour discharge time is 100%, the ratio of discharge capacity over discharge time of 20 minutes (with a large current condition where current density is 15 times more) is 88% (Example of Japanese Patent Application Laid-Open No. 2004-250275), there is room for further improvement. The cause can be assumed to be that the degree of crystallization of carbon fiber generated only through chemical deposition is generally low and is too insufficient to impart electroconductivity.

DISCLOSURE OF INVENTION

An object of the present invention is to provide an anode for lithium secondary battery comprising an anode active material which is a graphitic material using natural graphite or artificial graphite and carbon fiber having excellent electroconductivity and uniformly dispersed without forming an agglomerate of 10 μm or larger, a carbon fiber-containing composition necessary for producing the anode, an anode composition for lithium secondary battery, and a lithium secondary battery using the anode, which is excellent in long cycle life and large-current characteristics.

With a view to achieving the object in consideration of the above problem in electrode for lithium secondary battery, the inventors has made intensive studies and as a result, have realized a lithium secondary battery which is excellent in long cycle life and large-current characteristics by using natural graphite or artificial graphite as anode active material and uniformly dispersing carbon fiber having excellent electroconductivity without forming an agglomerate of 10 μm or larger in the anode.

For achievement of the anode where the carbon fiber is uniformly dispersed without forming an agglomerate of 10 μm or larger, a composition satisfying this purpose is required. In the invention, the composition has been realized by the following method.

(1) In a case where styrene butadiene rubber (hereinafter abbreviated as SBR) is used as binder, a liquid in which vapor grown carbon fiber is dispersed in an aqueous solution of a thickening agent (carbon fiber-containing composition) and a liquid in which anode active material and SBR are dispersed in an aqueous solution of a thickening agent are prepared in advance, and then the two liquids, at a desired ratio, are mixed together by stirring.

(2) In a case where polyvinylidene difluoride (hereinafter abbreviated as "PVDF") is used as binder, first, anode active material and carbon fiber are mixed together in a dry state and then, PVDF dissolved in N-methyl-2-pyrroridone serving as solvent is added thereto and mixed together by stirring.

That is, the invention is to provide an anode for lithium secondary battery, carbon fiber-containing composition for production of the anode, an anode composition for lithium secondary battery, and a lithium secondary battery using the anode.

[1] An anode for lithium secondary battery comprising anode active material which can occlude (i.e., absorb and store) and discharge lithium, electroconductive carbon material and binder, wherein the anode active material is a graphite material which uses natural graphite or artificial graphite having d(002), a planar spacing between (002) faces, of from 0.335 to 0.337 nm in the graphite structure as measured by powder X-ray diffraction method, wherein the electroconductive carbon material is vapor grown carbon fiber which has an average fiber diameter of 1 to 200 nm with a structure having a hollow space inside each fiber and has a structure where graphene sheets are laminated vertically against the length direction of the fiber and d(002), a planar spacing between (002) faces is from 0.336 to 0.345 nm in the graphite structure as measured by powder X-ray diffraction method, and wherein the vapor grown carbon fiber is contained at an amount of 0.1 to 10 mass % based on the total mass of the anode without forming an agglomerate of 10 μm or lager.

[2] The anode for lithium secondary battery according to 1, wherein the average aspect ratio of the vapor grown carbon fiber is within a range of 20 to 2000.

[3] The anode for lithium secondary battery according to 1, wherein the vapor grown carbon fiber has branched portions.

[4] A carbon fiber-containing composition, comprising a vapor grown carbon fiber and an aqueous solution of a thickening agent, wherein the vapor grown carbon fiber has an average fiber diameter of 1 to 200 nm with a hollow structure inside the fiber and a structure where graphene sheets are laminated vertically against the length direction of the fiber, wherein d(002), a planar spacing between (002) faces, is from 0.336 to 0.345 nm in the graphite structure as measured by powder X-ray diffraction method, wherein the vapor grown carbon fiber is dispersed in the aqueous solution of thickening agent, and wherein the viscosity at 25° C. is 5000 mPa·sec or lower.

[5] The carbon fiber-containing composition according to 4, wherein the vapor grown carbon fiber has an average aspect ratio of 20 to 2000.

[6] The carbon fiber-containing composition according to 4, wherein the vapor grown carbon fiber has branched portions.

[7] The carbon fiber-containing composition according to 4, wherein the concentration of the vapor grown carbon fiber in the composition is within a range of 1 to 20 mass % and the solid concentration of the aqueous solution of thickening agent is within a range of 0.3 to 3.0 mass %.

[8] The carbon fiber-containing composition according to 4, wherein the aqueous solution of thickening agent is an aqueous solution of carboxymethyl cellulose thickening agent.

[9] A method for producing an anode composition for lithium secondary battery, comprising mixing an anode-material-containing aqueous solution of a thickening agent which solution contains an anode active material which uses natural graphite or artificial graphite having d(002) of 0.335 to 0.337 nm in the graphite structure as measured by powder X-ray diffraction method and can absorb, store and discharge lithium, a thickening agent solution and water having styrene butadiene rubber dispersed therein and a carbon fiber-containing composition described in 4 by stirring.

[10] The production method according to 9, wherein the thickening agent solution is an aqueous solution of carboxymethyl cellulose thickening agent.

[11] A method for producing an anode composition for lithium secondary battery, comprising mixing an anode active material which uses natural graphite or artificial graphite having d(002) of 0.335 to 0.337 nm in the graphite structure as measured by powder X-ray diffraction method and can absorb, store and discharge lithium and vapor grown carbon fiber having a hollow structure inside, having a structure consisting of graphene sheets laminated vertically against the fiber axis and having d(002) of 0.336 to 0.345 nm in the graphite structure as measured by powder X-ray diffraction method in a dry state and then adding thereto polyvinylidene difluoride, followed by mixing while stirring.

[12] The production method according to 11, wherein the polyvinyledene difluoride is in liquid state dissolved in N-methyl-2-pyrrolidone.

[13] An anode for lithium secondary battery, obtained by coating a metal collector foil with the anode composition for lithium secondary battery prepared by a method described in any one of 9 to 12, drying and then pressure-molding.

[14] The anode for lithium secondary battery according to 13, wherein the metal collector foil is a Cu or a Cu-alloy foil having a thickness of 1 to 50 μm.

[15] A lithium secondary battery, containing the anode for lithium secondary battery described in any one of 1, 2, 3, 13 and 14 as a constituent.

[16] The lithium secondary battery described in 15, using nonaqueous electrolyte solution and/or nonaqueous polymer electrolyte, wherein nonaqueous solvent used in the nonaqueous electrolyte solution and/or nonaqueous polymer electrolyte contains at least one species selected from the group consisting of ethylene carbonate, diethyl carbonate, dimethyl carbonate, methylethyl carbonate, propylene carbonate, butylene carbonate, γ-butyrolactone and vinylene carbonate.

According to the present invention, an anode for lithium secondary battery not containing an agglomerate of 10 μm or larger of vapor grown carbon fiber used as electroconductive carbon material can be obtained. By using this, with respect to cycle life under discharge current density 1 C, the capacity retention ratio after 300 cycles, which is 41% in an anode of lithium secondary battery produced by a conventionally disclosed technique (JP 2000-133267 A) (Comparative Example 7), can be improved up to 74% (Example 7). Further, with respect to large-current characteristics, the invention achieved capacity retention ratio of 95% or more, improved as compared with 88% which is a value described in JP 2004-250275 A.

BEST MODE FOR CARRYING OUT THE INVENTION

Figure 1:
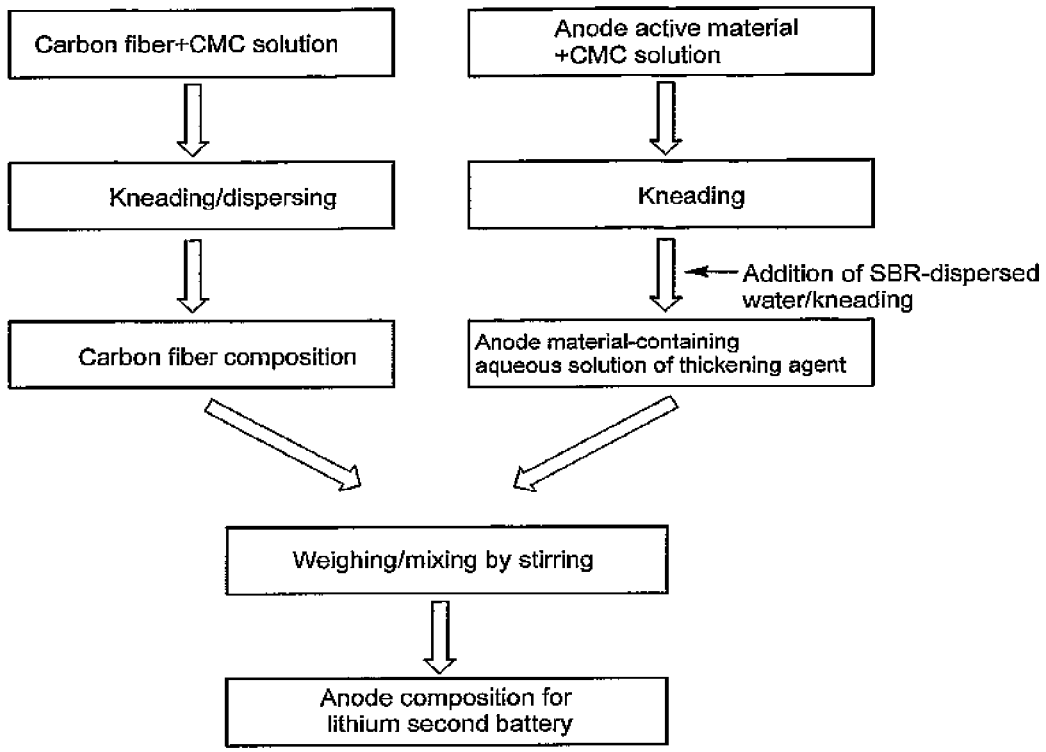
FIG. 1 is a production flow of anode composition for lithium secondary battery in case of using SBR as binder.
Figure 2:
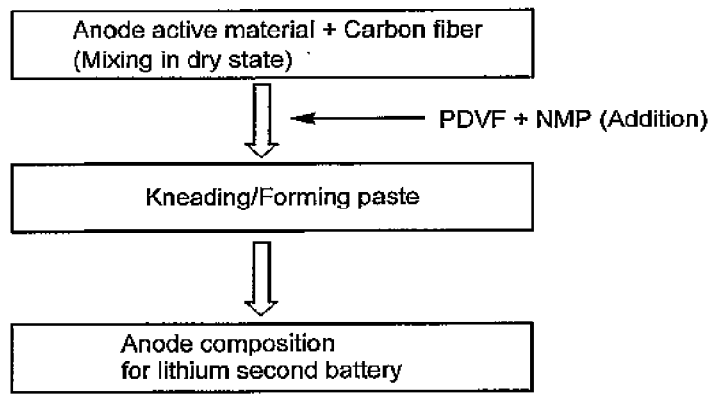
FIG. 2 is a production flow of anode composition for lithium secondary battery in case of using PVDF as binder.

The anode for lithium secondary battery according to the present invention consists of an anode active material which can absorb, store and discharge lithium, electroconductive carbon material and a binder, using as the anode active material, graphitic materials such as natural graphite or artificial graphite and using carbon fiber as electroconductive carbon material. The carbon fiber used herein is required not to form an agglomerate of 10 μm or larger in the anode.

The anode active material is graphitic material using natural graphite or artificial graphite, and it is necessary that planar spacing d(002) between (002) faces as measured by powder X-ray diffraction method be with in a range of 0.335 to 0.337 nm. If the value is out of this range, the battery capacity decreases. Moreover, the material preferably satisfies the following powder characteristics.

(1) As the specific surface area becomes larger, decomposition reaction of electrolyte solution on the surface of the anode active material increases, especially resulting in an extremely short cycle life and therefore, it is preferable that the specific surface area as measured by the BET method be within a range of 1 $m^2/g$ to 10 $m^2/g$, more preferably 1 $m^2/g$ to 8 $m^2/g$, even more preferably 1 $m^2/g$ to 6 $m^2/g$.

(2) As the particle size is small, the specific surface area increases and since the volume becomes bulky, it is difficult to enhance the electrode density. Moreover, a larger amount of binder is required, which causes deterioration of coatability. On the other hand, when the particle size is large, the specific surface area becomes excessively small, which causes decrease in interaction with binder or the like and further causes peeling-off of the electrode. In addition, in coating the collector with the anode composition for lithium secondary battery, large particles adversely affects coating film property by scratching the coating film, forming grooves and the like.

Accordingly, it is preferable that the particle size as measured by the laser diffraction method be within a range of 5 μm to 60 μm.

(3) The more planar the shape, the more highly oriented the graphite crystals become during the pressure-molding step in the production process of anode for lithium secondary battery, which causes decrease in cycle life. Moreover, since many of the reaction-active sites, i.e., the edges of the graphene sheets constituting the graphite crystals are exposed on the surface of the anode active material, reaction of decomposing electrolyte solution is accelerated, which can be the main cause for deterioration of battery performances or gas generation inside the battery. The more spherical the shape, the less oriented the graphite crystals can be and the fewer edges of the graphene sheets are exposed. Thus, it is preferable that the average sphericity of the anode active material be within a range of 0.70 to 0.99 as measured by a flow particle image analyzer.

The term "natural graphite" means graphitic materials mined from the nature as ores. Natural graphite can be classified by appearance and property, into two types, one type of scaly graphite with high degree of crystallization and the other type of amorphous graphite with low degree of crystallization. The scaly graphite can be subdivided by its appearance into a flake graphite type having a leaf-like appearance and a massive type. Although natural graphite is produced all over the world including China, Brazil, Madagascar, Zimbabwe, India, Sri Lanka, Mexico and the Korean Peninsula, properties of graphites vary a little depending on the production area.

With respect to the natural graphite serving as graphitic material in the invention, there is no particular limitation on the production area, properties and the type. Further, the natural graphite or particles produced from raw material of the natural graphite may be used after being subjected to thermal treatment.

Further, the term "artificial graphite" means graphite produced by a wide range of artificial method and graphitic material very close to perfect crystal of graphite. Representative examples include those produced through calcination process at 500 to 1000° C. and graphitization process at 2000° C. or higher by using as raw material tar or coke obtained from residues from coal carbonization or crude oil distillation. In addition, kish graphite is also one kind of artificial graphites which is obtained by reprecipitation of carbon from molten iron.

As electroconductive carbon material, carbon fiber is used. When carbon fiber is too thick, dispersability into anode is decreased and densification of anode electrode is inhibited. Moreover, when the fiber is too short, no effect of effectively maintaining electroconductivity can be exhibited. In contrast, when the fiber is too long, the carbon fiber tends to agglomerate, which leads to decrease in dispersibility into anode. Therefore, it is desirable that the average fiber diameter be within a range of 1 to 200 nm, more preferably from 10 to 200 nm.

Furthermore, it is preferable that the aspect ratio calculated from the average fiber diameter and the average fiber length (=average fiber length/average fiber diameter) be, on average, within a range of 20 to 20000, more preferably from 20 to 4000, even more preferably from 20 to 2000.

There is no particular limitation on carbon fiber to be used in the invention, as far as the carbon fiber has good electroconductivity. However, vapor grown carbon fiber having a high degree of crystallization and having graphene sheets laminated vertically against the fiber axis is preferable.

Vapor grown carbon fiber can be produced, for example by blowing in a gasified organic compound with iron serving as catalyst in high temperature atmosphere.

Any of the vapor grown carbon fibers, those as produced, those having been thermally treated at a temperature of about 800 to 1500° C. and those having been subjected to graphitization at a temperature of about 2000 to 3000° C., can be used. However, those having been thermally treated or further having been subjected to graphitization, which have a higher degree of carbon crystallization and high electroconductivity and high resistance to pressure, are preferred.

For the purpose of enhancing the degree of crystallization, it is effective to add boron as a graphitization accelerator before graphitization step and then conduct graphitization. There is no limitation on the source of boron. For example, by adding powder such as boron oxide, boron carbide or boron nitride into vapor grown carbon fiber before graphitization, the degree of crystallization can be easily improved. On this occasion, it is preferable that the concentration of boron remaining in the vapor grown carbon fiber be within a range of 0.1 to 100000 ppm. If the amount of the remaining boron is too small, only a small effect of enhancing crystallization can be obtained. If the amount of the remaining boron is too large, that does not contributes to enhancement of crystallization, resulting in increasing the amount of boron as a compound having low electroconductivity, thus becoming a cause to decrease electroconductivity of the vapor grown carbon fiber.

Further, as a preferred form of vapor grown carbon fiber, there is branched fiber. A fiber of such branched fiber has a hollow structure in which the hollow space continues along the whole fiber including branching portions, and carbon layers consisting of the cylindrical portion also continue. The hollow structure is formed by carbon layers rolling into a cylindrical shape and includes structures having an imperfect cylindrical shape, having some broken portions, having a layer formed of two carbon laminates integrated and the like. Also the cross-section surface of the cylinder is not necessarily perfect circle and may be oval or multangular.

Many of vapor grown carbon fibers include irregularities or roughness on the surface, which is advantageous in enhancing adhesiveness to anode active material. By this adhesiveness, the state where anode active material and vapor grown carbon fiber is adhered to each other without separating can be maintained, which leads to maintaining electroconductivity of anode and enhancing cycle life.

In a case where the vapor grown carbon fiber contains a large amount of branched fiber, a network can be efficiently formed in the anode. Also, the carbon fiber can be dispersed as if it wraps the anode active material around, which leads to enhancing strength of electrode and maintaining good contact between anode active material particles.

The amount of carbon fiber to be contained in an anode is within a range of 0.1 to 20 mass %, preferably 0.1 to 10 mass %. Too large an amount of carbon fiber may cause decrease in electrode density in the anode or in coatability. In contrast, an amount less than 0.1 mass % results in insufficient effect of maintaining electroconductivity of the anode and also in drastic deterioration of cycle life. Adjusting the amount of carbon fiber within the above specified range can be conducted by adding the carbon fiber at the corresponding ratio in the production process.

In order for carbon fiber to exhibit the effect of maintaining electroconductivity, it is necessary to uniformly disperse the carbon fiber into anode without forming agglomerates. Because of its filamental shape, carbon fiber inherently tends to form agglomerates in a process of producing anode composition or the like. However, in the invention, it is necessary to produce an anode, at least without forming an agglomerate of 10 μm or larger. Presence of agglomerates of 10 μm or larger would result in uneven distribution of carbon fiber having high electroconductivity, which would disadvantageously cause uneven distribution of electroconductivity in the anode and difficulty in enhancing electrode density in the anode. The anode for lithium secondary battery having no carbon fiber agglomerate of 10 μm or larger can be produced by using the following carbon fiber-containing composition and anode composition for lithium secondary battery according to the invention.

In the method for producing the anode composition for lithium secondary battery according to the invention, the mixing order varies depending on materials used as binder and as solvent.

In a case where styrene butadiene rubber is (SBR) used as binder, examples of thickening agent to be used include polyethylene glycol, cellulose, polyacrylamide, poly-N-vinylamide and poly-N-vinylpyrrolidone. Among these, polyethylene glycol and cellulose such as carboxymethylcellulose (CMC) are preferred and particularly preferred is carboxymethylcellulose (CMC) which has high affinity for SBR. With respect to CMC, although there are a sodium salt type and an ammonium salt type, there is no particular limitation on it.

First, an aqueous solution of thickening agent is prepared. On this occasion, the solid content of the thickening agent in the aqueous solution is adjusted to a range of 0.3 to 3 mass %. If this solid concentration is too low, thickening effect is low and therefore, a large amount of an aqueous solution of thickening agent needs to be used, which results in failure to obtain a high-density anode for lithium secondary battery. In contrast, if the solid concentration is too high, viscosity of the anode composition for lithium secondary battery becomes high, which results in failure to coat the collector and causes carbon fiber to form agglomerates.

Next, the thus prepared thickening agent aqueous solution is portionwise added to carbon fiber while kneading to obtain a carbon-fiber-containing composition in which carbon fiber is dispersed to a final concentration of carbon fiber of from 1 to 20 mass %. If the carbon fiber concentration is too low, addition of a large amount of the composition to the thickening agent solution containing anode active material described later is necessitated and therefore, a high-density anode for lithium secondary battery cannot be obtained. In contrast, if the concentration is too high, it causes carbon fiber to form agglomerates. It is preferable to adjust viscosity of carbon fiber-containing composition to 5000 mPa·sec or less. If the viscosity is too high, carbon fiber readily forms agglomerates in the anode for lithium secondary battery. More preferably, when the viscosity is adjusted to be within a range of 2000 to 5000 mPa·sec, the composition is easy to handle.

Next, a thickening agent solution containing anode material consisting of anode active material, a thickening agent aqueous solution and SBR is prepared. To anode active material, the above-described thickening agent solution is portionwise added while kneading, to thereby obtain a solution having a final viscosity of 5000 mPa·sec or less. If the viscosity is too high, it is impossible to coat a collector with the solution. Moreover, by adding styrene butadiene rubber-dispersed water (for example, BM-400B produced by Nippon Zeon Co., Ltd. can be used) and mixing it through stirring, a thickening agent aqueous solution containing anode material can be obtained.

Next, to the above-described thickening agent aqueous solution containing anode material, the above-described carbon fiber containing composition is added so that the concentration of carbon fiber may be 0.1 to 10 mass %, assuming that the total amount of anode active material, carbon fiber, SBR and CMC is 100 mass %, the anode composition for lithium secondary battery can be produced.

Kneading in preparation of the carbon fiber-containing composition and the thickening agent aqueous solution containing anode material and also preparation of the anode composition for lithium secondary battery may be conducted by using a known apparatus. Examples of usable apparatus include ribbon mixer, screw-type kneader, SPARTAN-RYUZER, Loedige Mixer, planetary mixer, all-purpose mixer and non-bubbling kneader.

Next, production method for the anode composition for lithium secondary battery in case of using polyvinyledene difluoride (PVDF) as a binder is shown below.

Anode active material and carbon fiber are weighed so that the concentration of carbon fiber may be within a range of 0.1 to 10 mass % assuming that the total amount of anode active material, carbon fiber and PVDF which is added in the subsequent step is 100 mass %, and are mixed in dry state. The mixing step here may be conducted by using a known apparatus. Examples thereof include ribbon mixer, screw-type kneader, SPARTAN-RYUZER, Loedige Mixer, planetary mixer, all-purpose mixer and non-bubbling kneader. Although the optimum mixing time, which depends on the type of mixing apparatus and the size of the container used, cannot be flatly defined, mixing for 5 to 30 seconds is generally sufficient.

Next, a predetermined amount of PVDF (for example, KF-polymer produced by KUREHA CORPORATION may be used) dissolved in N-methyl-2-pyrrolidone is added to the above-prepared mixture and by mixing while stirring, an anode composition for lithium secondary battery can be obtained. Also on this occasion, mixing through stirring may be conducted by using a known apparatus. Examples of usable apparatus include ribbon mixer, screw-type kneader, SPARTAN-RYUZER, Loedige mixer, planetary mixer, all-purpose mixer and non-bubbling kneader.

By using the anode composition for lithium secondary battery according to the invention, an anode for lithium secondary battery can be produced. By applying the above anode composition for lithium secondary battery on a Cu or Cu-alloy foil having a thickness of 1 to 50 μm, drying and pressure-molding, the anode material for lithium secondary battery can be obtained. If the foil is too thin, mechanical strength decreases while if too thick, inflexibility increases. Therefore, in both the cases, production of battery is difficult.

The above-described coating step may be conducted by a known method. For example, a doctor blade or a bar coater may be used. In the subsequent pressure-molding step, a roll press machine or the like may be used.

The lithium secondary battery of the invention can be realized by incorporating as a constituent, an anode for lithium secondary battery obtained by using as raw material the anode composition for lithium secondary battery according to the production method of the invention. The production method of the lithium secondary battery is shown below.

Examples of raw materials for cathode active material usable in cathode and capable of absorbing, storing and discharging lithium include cobalt-based oxides such as lithium cobaltate, mangane-based oxides such as lithium manganate, nickel-based oxides such as lithium nickelate, vanadium-based oxides such as vanadium pentoxide and composite oxides and mixtures of these compounds, however are not limited thereto.

The particle size of cathode active material is not particularly limited. Generally the particle size is preferably from 0.1 to 50 μm. The specific surface area is not particularly limited either, and the value measured by BET method is preferably from 0.2 m$^2$/g to 10 m$^2$/g.

The method for preparing the cathode is not particularly limited. Generally, by mixing the above described cathode active material, electroconductive carbon material and binder material, applying the mixture on a support substrate such as metal collector, drying and pressing, the cathode can be obtained.

Examples of electroconductive carbon material used here include carbon black, acetylene black, carbon fiber, vapor grown carbon fiber and carbon nanotube. As binder, PVDF can be used.

Mixing cathode active material, electroconductive carbon material and binder may be conducted, for example, by stirring with a blender or the like. Stirring method is not particularly limited and for example, an apparatus such as ribbon mixer, screw-type kneader, SPARTAN-RYUZER, Loedige Mixer, planetary mixer, all-purpose mixer or non-bubbling kneader may be employed.

It is preferable that the amount of the binder used be adjusted to be within a range of 1 to 15 mass % assuming that the total amount of the cathode active material, the electroconductive carbon material and PVDF is 100 mass %.

Coating onto the collector may be conducted by a known method and an example thereof is a method of coating with a doctor blade or a bar coater, drying and pressure-molding with a roll press machine. As a collector, a known material such as aluminum, stainless steel, nickel, titanium, an alloy of these metals, platinum or carbon sheet may be employed.

The lithium secondary battery can be manufactured by a known method. A representative example for producing a lithium ion battery and/or a lithium ion polymer battery is described below, however, the method is not limited thereto.

The above prepared anode is processed into a desired shape and then in combination with a cathode, forms a laminate consisting of cathode/separator/anode so that the anode may not contact the cathode. The thus formed laminate is placed in a container having a shape of coin, rectangular, cylinder or sheet. In a case where some moisture or oxygen may be absorbed during the laminating and placing steps, the product as is again subjected to drying under reduced pressure and/or in an inert atmosphere at dew point (−50° C.), and transferred into an inert atmosphere at dew point (−50° C.). Subsequently, electrolyte solution is poured into the container and the container is sealed up, to thereby obtain a lithium ion battery or a lithium polymer battery.

As a separator, a known one may be used. From the viewpoint of thinness and high strength, a microporous film made of polyethylene and polypropylene is preferred. From the viewpoint of ion conduction, the higher the porosity, the more preferable. However, if the porosity is too high, strength decreases or causes short circuit between the cathode and the anode. Therefore, the porosity is controlled to be from 30 to 90%, preferably from 50 to 80%. Moreover, with respect to the film thickness, from the viewpoint of ion conduction and battery capacity, the thinner, the more preferable. However, if too thin, strength decreases or causes short circuit between the cathode and the anode. Therefore, generally, the thickness is from 5 to 100 μm, preferably 5 to 50 μm. the microporous film can be a combination of two or more kinds or a combination including a nonwoven fabric.

As electrolyte solution and electrolyte in non-aqueous secondary battery, especially lithium ion battery and/or lithium polymer battery, a known organic electrolyte solution, inorganic solid electrolyte or solid polymer electrolyte can be used.

Preferred examples of organic electrolyte solution include ethers such as diethylether, dibutylether, ethyleneglycol monomethylether, ethyleneglycol monoethylether, ethyleneglycol monobutylether, diethyleneglycol monomethylether, diethyleneglycol monoethylether, diethyleneglycol monobutylether, diethyleneglycol dimethylether and ethyleneglycol phenylether; amides such as formamide, N-methylformamide, N,N-dimethylformamide, N-ethylformamide, N,N-diethylformamide, N-methylacetamide, N,N-dimethyl acetamide, N-ethylacetamide, N,N-diethylacetamide, N,N-dimethylpropion amide and hexamethyl phosphorylamide; sulfur-containing compounds such as dimethyl sulfoxide and sulfolane; dialkylketones such as methylethylketone and methylisobutylketone; cyclic ethers such as ethylene oxide, propylene oxide, tetrahydrofuran, 2-methoxytetrahydrofuran, 1,2-dimethoxyethane and 1,3-dioxolane; carbonates such as ethylene carbonate and propylene carbonate; γ-butyrolactone; N-methylpyrrolidone; and solutions of organic solvents such as acetonitrile and nitromethane. More preferred are esters such as ethylene carbonate, butylene carbonate, diethylcarbonate, dimethylcarbonate, propylene carbonate, vinylene carbonate, γ-butyrolactone, ethers such as dioxolane, diethylether and diethoxyethane, dimethyl sulfoxide, acetonitrile and tetrahydrofuran. Particularly preferably, carbonate-base nonaqueous solvenet such as ehylene carbonate and propylene carbonate can be used. One of these solvents may be used singly or a mixture of two or more of them may be used. As solute (electrolyte) in these solvent, lithium salt is used. Examples of generally known lithium salts include, $LiClO_4$, $LiBF_4$, $LiPF_6$, $LiAlCl_4$, $LiSbF_6$, LiSCN, LiCl, $LiCF_3SO_3$, $LiCF_3CO_2$ and $LiN(CF_3SO_2)_2$.

Examples of solid polymer electrolyte include polyethylene oxide derivative, polymer containing the derivative, propylene oxide derivative, polymer containing the derivative, phosphate polymer, polycarbonate derivative and polymer containing the derivative.

Choices of members other than the above materials required in battery construction are not limited.

EXAMPLES

With representative examples of the invention shown below, the invention is described in more detail. The examples are shown merely for illustrating the invention and therefore, the invention is by no means limited thereto.

Properties and the like shown in the examples were measured by the following methods and apparatuses.

[1] Average Particle Size:
measured with a particle size analyzer using the laser diffraction and scattering method, Microtrack HRA (manufactured by NIKKISO CO., LTD.).

[2] Specific Surface Area:
measured with a specific surface area measuring apparatus, NOVA-1200 (produced by Yuasa Ionics) by the BET method using liquid nitrogen, which is a general method for measuring specific surface area.

[3] Sphericity:
evaluated with a flow particle image analyzer, FPIA-2100 (produced by SYSMEX Co., Ltd.) by the following evaluation method.

Graphite fine powder sample was dispersed in water containing surfactant and introduced through syringe of the flow particle image analyzer. Images of the sample (fine powder-dispersed liquid) flowing in the core part of the flow cell were taken every 1/30 second by using a CCD camera and static images were processed in real time. The sphericity was calculated by the following equation.

$$Sphericity = (\text{perimeter calculated from a diameter of a corresponding circle})/(\text{perimeter of projected image of particle})$$

The "diameter of a corresponding circle" is a diameter of a perfect circle having an area corresponding to the perimeter of the projected image of a particle actually photographed. The sphericity is a value obtained by dividing it by the perimeter of the projected image of a particle actually photographed. For example, in case of a perfect circle, the sphericity value is 1, and the more complicated the shape of the particle image, the smaller the sphericity value. An average sphericity is calculated for each individual particle.

[4] Viscosity:
measured with a B-type rotating viscometer LV-series (produced by Brookfield Engineering laboratories, Inc.). First, sample to be measured was placed in a stainless-steel container and attached to the measuring apparatus. In order to keep the temperature of the sample constant, the container was immersed in a constant-temperature bath set to 25° C. Then, the rotor was rotated and 3 minutes after starting the rotation, viscosity was measured. Each sample was measured twice and the average value was used. As the rotor, No. 4 rotor was used and the rotation rate was 6 rpm.

[5] Method for Evaluating Battery:
(1) Preparation of Anode

As procedures of preparing an anode, preparing an anode composition, coating, drying and pressure molding are sequentially conducted. The following are procedures including coating and steps thereafter.

The anode compositions prepared by respective methods were each applied to a predetermined thickness onto a flat-rolled copper foil (thickness 18 μm, produced by Nippon Foil Mfg. Co., Ltd.) by using a doctor blade. This was vacuum-dried at 120° C. for 1 hour and the foil was cut out into 18 mmΦ by punching. Further, the thus cut electrode was sandwiched between super-steel pressing plates and pressed at a pressing pressure of about $1 \times 10^2$ to $3 \times 10^2 N/mm^2$ ($1 \times 10^3$ to $3 \times 10^3 kg/cm^2$) for the electrode. The coating weight was from 7 to 9 mg/cm², the thickness was from 40 to 60 μm, and the electrode density was 1.6 g/cm³. Then, the electrode was dried at 120° C. in a vacuum drier and employed for evaluation.

(2) Preparation of Cathode
Preparation of a cathode to be combined with the anode obtained in above (1) is shown below.

$LiCoO_4$ Cellseed C-10 (produced by Nippon Chemical Industrial Co., Ltd.) and acetylene black (produced by DENKI KAGAKU KOGYO KABUSHIKI KAISHA), at a mass ratio of 95:5, were mixed with each other in a dry state by using a small-size, high-speed blade blender IKA (produced by IKA-Labotechnik Staufen (Janke & Kunkel GmbH)) at 10000 rpm for 10 seconds, to thereby prepare cathode material mixture. To this, N-methyl2-pyrrolidone (NMP) solution containing 12 mass % of KF-polymer L#1320 (polyvinylidene difluoride (PVDF), produced by KUREHA Corporation) was added such that the mass ratio of the cathode material mixture and the PVDF is 95:3. The resultant mixture was kneaded at 500 rpm for 5 minutes by using a non-bubbling kneader NBK-1 (NISSEI Corporation) with a stirring ball (ø12 mm) put in the kneader, to thereby obtain pasty cathode composition.

The above cathode composition was applied to a predetermined thickness onto a rolled aluminium foil produced by SHOWA DENKO K.K. (thickness 25 μm) by using a doctor blade. This was vacuum-dried at 120° C. for 1 hour and then cut out into 18 mmΦ by punching. Further, the cut out electrode was sandwiched and pressed between super-steel pressing plates at a pressing pressure of about $1 \times 10^2$ to $3 \times 10^2$ N/mm² ($1 \times 10^3$ to $3 \times 10^3$ kg/cm²) for the electrode. Then, the electrode was dried in a vacuum drier at ° C. for 12 hours and employed for evaluation. The thickness was about 80 µm and the electrode density was about 3.5 g/cm³.

(3) Preparation of Tripolar Cell for Lithium Ion Battery Test

A tripolar cell was prepared as follows. The following procedures were conducted in a glove box of dry argon atmosphere at dew point −80° C. or lower.

In a polypropylene-made cell (inner diameter of about 18 mm) having a screw-in lid, the anode with a copper foil obtained in above (1) and a metal lithium foil as counter electrode were laminated with a separator (polypropylene-made microporous film, Cell Guard 2400 produced by Tonen Corporation) sandwiching them. Further, a metal lithium foil (50 µm) for reference was laminated thereon similarly. Electrolyte solution was added thereto to thereby obtain a test cell.

(4) Preparation of Coin Cell for Lithium Ion Battery Test

A coin cell was prepared as follows. The following procedures were conducted in a glove box of dry argon atmosphere at dew point −80° C. or lower.

In a SUS304-made receiving casing having a cylindrical shape, a spacer, a flat spring, the anode with a copper foil obtained in above (1) and the cathode with a aluminum foil obtained in above (2) were laminated with a separator (polypropylene-made microporous film, Cell Guard 2400 produced by Tonen Corporation) sandwiching them. Further, the top was covered with a SUS304-made casing having a cylindrical shape which served as a top lid.

Next, this was immersed in electrolyte solution to conduct vacuum immersion for 5 minutes. Then by caulking the coin cell with a caulking device, a test coin cell was obtained.

(5) Electrolyte Solution

A solution of 1.0 mol/l of $LiPF_6$ as solute dissolved in a mixture of 8 parts by mass of EC (ethylenecarbonate) and 12 parts by mass of SEMC ethylmethylcarbonate) was used as electrolyte solution.

(6) Test for Evaluating Properties of High-Rate Battery

By using tripolar cells for evaluation, Constant-voltage constant-current charge-discharge test was conducted.

CC (constant-current) charging was conducted from the rest potential to 2 mV at 0.2 mA/cm². Subsequently, the charging was switched to CV (constant voltage) charging at 2 mV, and stopped at the time point when the current value fell to 12.0 µA.

CC discharging was conducted at respective current densities (0.2 mA/cm², (corresponding to 0.1 C) and 4.0 mA/cm² (corresponding to 2.0 C)) and cut off at a voltage of 1.5 V.

The ratio of at the discharging capacity ratio at 2.0 C against the discharging capacity ratio at 0.1 C was defined as a capacity retention rate in high-rate discharging and evaluation was made.

(7) Charge-Discharge Cycle Life Test

By using coin cells for evaluation, constant-voltage constant-current charge-discharge test was conducted.

In the first two charge/discharge cycles, CC (constant current) charging was carried out from the rest potential to 4.2 at 0.2 mA/cm², then switched to CV (constant voltage) charging at 4.2 V and stopped at the time point when the current value fell to 25.4 µA. Subsequently, CC discharging was carried out at 0.2 mA/cm² and cut of off at a voltage of 2.7 V.

In the third cycle and cycles thereafter, CC (constant current) charging was carried out from the rest potential to 4.2 V at 1.0 mA/cm² (corresponding to 0.5 C), then switched to CV (constant voltage) charging at 4.2 V, and stopped at the time when the current value fell to 25.4 µA. Subsequently, CC discharging was carried out at currency density of 2.0 mA/cm² (corresponding to 1.0 C) and cut off at a voltage of 2.7 V. The ratio of the discharge capacity in the $300^{th}$ cycle against the discharge capacity in the $2^{nd}$ cycle was defined as cycle charge capacity retention rate and evaluation was conducted.

[6] Method for Observing Agglomeration State of Carbon Fiber:

Observation of carbon fiber was conducted with a scanning electron microscope T-20 (produced by JEOL Ltd.) by the following method.

A sample electrode was pressed at 1 t/cm², and placed on a microscope stage for observation. The stage was inclined at an angle of from 30 to 60° from horizontal state, so that the vision was adjusted to be wide to the extent that the whole surface of the electrode could be observed at the minimum magnification (×35). In the observation, presence or absence of convexes on the sample surface (protuberances) was confirmed. In a case where agglomerates of carbon fiber occurred, the existence could be detected by judging from portions which appeared more protuberant than other portions.

[7] Materials Used for Anode:

(1) Anode Active Material

LB-CG: spherical natural graphite (Nippon Graphite Industries, Ltd.)
  X-ray d(002): 0.3359 nm
  specific surface area: 6 m²/g
  average particle size: 20 µm
  sphericity: 0.90

MCMB (25-28): mesophase spherical artificial graphite (produced by OSAKA GAS Co., Ltd.)
  X-ray d(002): 0.3363 nm
  specific surface area: 0.9 m²/g
  average particle size: 25 µm
  sphericity: 0.93

SCMG-A: massive artificial graphite (produced by SHOWA DENKO K.K.)
  X-ray d(002): 0.3367 nm
  specific surface area: 2.2 m²/g
  average particle size: 20 µm
  sphericity: 0.86

(2) Carbon Fiber

VGCF: vapor grown graphite fiber (produced by SHOWA DENKO K. K.)
  average fiber diameter (by SEM image analysis): 150 nm,
  average fiber length (by SEM image analysis): 8 µm,
  average aspect ratio: 53
  branching degree: about 0.1 branch/µm
  (the number of branching points per 1 µm of fiber length was analyzed from SEM images; the same in below)
  X-ray d(002): 0.3384 nm,
  Lc (crystallite size): 48 nm.

VGCF-H: vapor grown graphite nonofiber (produced by SHOWA DENKO K. K.)
  average fiber diameter (by SEM image analysis): 150 nm,
  average fiber diameter (by SEM image analysis): 6 µm,
  average aspect ratio: 40
  branching degree: 0.05 branches/µm,
  X-ray d(002): 0.3384 nm, Lc: 35 nm.

VGCF-S: vapor grown graphite fiber (produced by SHOWA DENKO K.K.)
  average fiber diameter (by SEM image analysis): 120 nm,
  average fiber length (by SEM image analysis): 12 µm,
  average aspect ratio: 100 branching degree: about 0.02 branches/μm,
X-ray d(002): 0.3385 nm, Lc: 48 nm
VGNT: vapor grown graphite nanotube (produced by SHOWA DENKO K.K.)
average fiber diameter (by SEM image analysis): 25 nm,
average fiber length (by SEM image analysis): 5 μm,
average aspect ratio: 200,
branching degree: 0.1 branch/μm,
X-ray d(002): 0.3449 nm, Lc: 30 nm.
(3) Binder
styrene butadiene rubber (SBR): BM-400B (produced by ZEON CORPORATION)
polyvinyledene difluoride (PVDF): KF-polymer L#9210 (produced by KUREHA CORPORATION)
(4) Thickening Agent
carboxymethylcellulose (CMC): WS-C (produced by DAI-ICHI KOGYO SEIYAKU CO., LTD.)
(5) Solvent
N-methyl2-pyrrolidone (NMP): EP-II (produced by SHOWA DENKO K.K.)

Example 1

As a 1 mass % aqueous solution of CMC prepared in advance was portionwise added to 20 g of VGCF, kneading was conducted with a multi-purpose blender, T.K. HIVIS MIX (registered trademark) f-model 03 (produced by PRI-MIX Corporation) for 90 minutes. As a result, a carbon fiber-containing composition containing 8.5 mass % of VGCF was prepared. The viscosity of this solution was 4000 mPa·sec.

As a 1 mass % aqueous solution of CMC prepared in advance was portionwise added to 70 g of spherical natural graphite LB-CG, kneading was conducted with a multi-purpose blender, T.K. HIVIS MIX (registered trademark) f-model 03 for 2 hours. As a result, a CMC solution containing 50 mass % of spherical natural graphite LB-CG was prepared. To this solution, SBR-dispersed water BM-400B was added so that SBR solid content was 1.5 mass %, and kneaded for 1 hour. The viscosity of this thickening agent solution containing anode material was 3500 mPa·sec.

Next, the carbon fiber-containing composition and the thickening agent solution containing anode material were mixed together so that the VGCF content was 2 mass % assuming that the sum total amount of LB-CG, VGCF, SBR and CMC was 100 mass % and the mixture was kneaded for 15 minutes.

By using the thus-obtained anode composition for lithium secondary battery, according to the aforementioned method of "Preparation of anode", an anode for lithium secondary battery was prepared.

Figure 3:
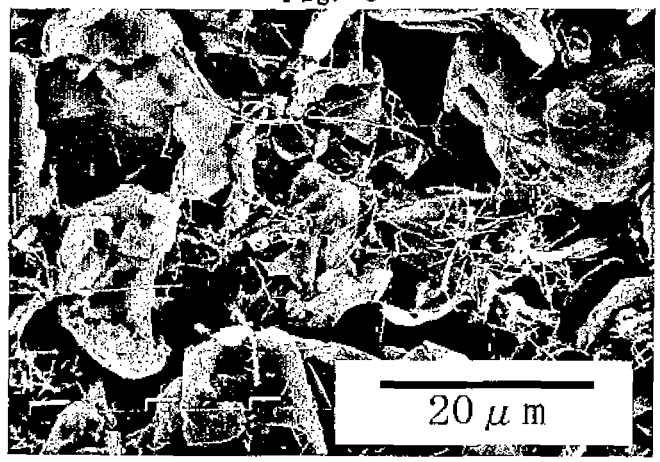
FIG. 3 is an SEM image of the anode material for lithium secondary battery (before pressing) in Example 1.
Figure 4:
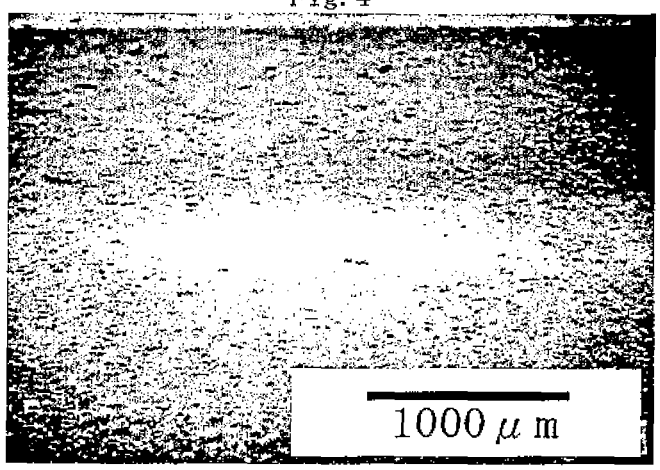
FIG. 4 is an SEM image of the anode for lithium secondary battery (after pressing) in Example 1.

FIG. 3 shows a magnified SEM image of the state of the anode material before pressing, and FIG. 4 shows an SEM image of the state of the anode surface after pressing. As apparent from FIG. 3, carbon fiber present in the anode material was well dispersed, and on the anode surface shown by FIG. 4, no agglomerate having a diameter exceeding 10 μm was observed.

Example 2

An 1 mass % aqueous solution of CMC which had been prepared in advance was portionwise added to 70 g of massive artificial graphite SCMG-A while kneading was conducted with a multi-purpose blender, T.K. HIVIS MIX (registered trademark) f-model 03 for 2 hours. As a result, a CMC solution containing 60 mass % of massive artificial graphite SCMG-A was prepared. To this solution, SBR-dispersed water BM-400B was added so that SBR solid content was 1.5 mass %, and kneaded for 1 hour. The viscosity of this thickening agent solution containing anode material was 3000 mPa·sec.

The other procedures were conducted in the same way to thereby prepare an anode for lithium secondary battery.

The obtained anode was observed by using an scanning electronic microscope in the same manner as in Example 1, carbon fiber was well dispersed in the anode material and no agglomerate of carbon fiber having a diameter exceeding 10 μm was observed.

Example 3

1 mass % of $B_4C$ was added to VGCF and by using small-size graphitization furnace (produced by KABUSHIKI KAISHA SAN RIKO DENKI), thermal treatment was conducted at 2800° C. in an argon gas flow. After cooling and collecting, d(002) measured by powder X-ray diffraction method was 0.3376 nm. By using this product of boron-treated VGCF, an anode for lithium secondary battery was prepared in the same method as in Example 1.

The obtained anode was observed by using an scanning electronic microscope in the same manner as in Example 1, carbon fiber was well dispersed in the anode material and no agglomerate of carbon fiber having a diameter exceeding 10 μm was observed.

Example 4

As an 1 mass % aqueous solution of CMC prepared in advance was added portionwise to 20 g of VGCF-H, kneading was conducted with a multi-purpose blender, T.K. HIVIS MIX f-model 03 ((registered trademark) produced by PRI-MIX Corporation) for 90 minutes, to thereby obtain a carbon-fiber containing composition having a VGCF-H concentration of 14.0 mass %. The viscosity of the solution was 3000 mPa·sec.

The procedures thereafter were conducted in the same method as in Example 1, to thereby obtain an anode for lithium secondary battery.

The obtained anode was observed by using an scanning electronic microscope in the same manner as in Example 1, carbon fiber was well dispersed in the anode material and no agglomerate of carbon fiber having a diameter exceeding 10 μm was observed.

Example 5

As an 1 mass % aqueous solution of CMC prepared in advance was added portionwise to 20 g of VGCF-S, kneading was conducted with a multi-purpose blender, T.K. HIVIS MIX f-model 03 ((registered trademark) produced by PRI-MIX Corporation) for 90 minutes, to thereby obtain a carbon-fiber containing composition having a VGCF-S concentration of 5.3 mass %. The viscosity of the solution was 4900 mPa·sec.

The procedures thereafter were conducted in the same method as in Example 1, to thereby obtain an anode for lithium secondary battery.

The obtained anode was observed by using an scanning electronic microscope in the same manner as in Example 1, carbon fiber was well dispersed in the anode material and no agglomerate of carbon fiber having a diameter exceeding 10 μm was observed.

Example 6

As an 1 mass % aqueous solution of CMC prepared in advance was added portionwise to 20 g of VGNT, kneading was conducted with a multi-purpose blender, T.K. HIVIS MIX f-model 03 ((registered trademark) produced by PRIMIX Corporation) for 90 minutes, to thereby obtain a carbon-fiber containing composition having a VGNT concentration of 5.3 mass %. The viscosity of the solution was 4800 mPa·sec.

The procedures thereafter were conducted by the same method as in Example 1, to thereby obtain an anode for lithium secondary battery.

Figure 5:
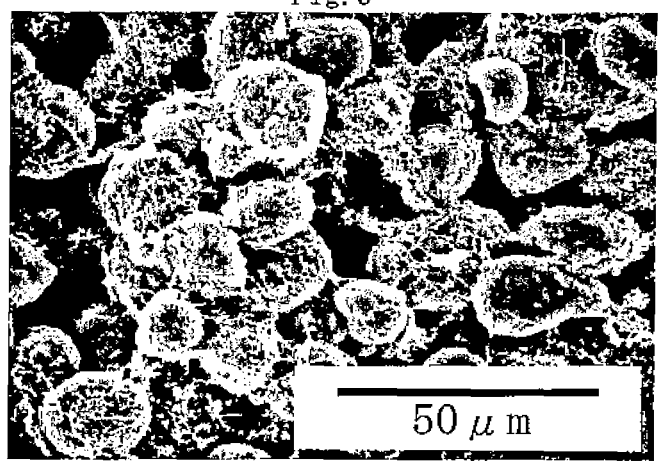
FIG. 5 is an SEM image of the anode material for lithium secondary battery (before pressing) in Example 6.
Figure 6:
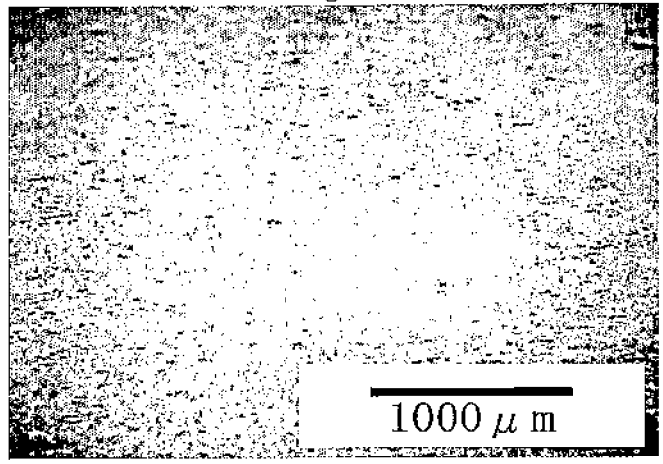
FIG. 6 is an SEM image of the anode for lithium secondary battery (after pressing) in Example 6.

FIG. 5 shows a magnified SEM image of the state of the anode material before pressing, and FIG. 6 shows an SEM image of the state of the anode surface after pressing. As apparent from FIG. 5, carbon fiber present in the anode material was well dispersed, and on the anode surface shown by FIG. 6, no agglomerate having a diameter exceeding 10 µm was observed.

Example 7

Spherical artificial spherical graphite MCMB (25-28) and VGCF were mixed in dry state by using a small-size, high-speed blade blender IKA (produced by IKA-Labotechnik Staufen (Janke & Kunkel GmbH)) at 10000 rpm for 10 seconds. Then, an NMP solution of PVDF (KF-polymer) was added thereto. The addition was conducted after calculation, such that the mass ratio between MCMB, VGCF and PVDF became 93:2:5.

Next, as NMP was added portionwise thereto, viscosity of the anode composition was adjusted. By using the thus obtained anode composition for lithium secondary battery, an anode for lithium secondary battery was prepared according to the afore-mentioned "Preparation of anode" method.

The obtained anode was observed by using an scanning electronic microscope in the same manner as in Example 1, carbon fiber was well dispersed in the anode material and no agglomerate of carbon fiber having a diameter exceeding 10 µm was observed.

Comparative Example 1

20 g of spherical artificial graphite LB-CG and 0.4 g of VGCF were mixed in dry state by using a small-size, high-speed blade blender IKA (produced by IKA-Labotechnik Staufen (Janke & Kunkel GmbH)) at 10000 rpm for 10 seconds. As a 1 mass % aqueous solution of CMC prepared in advance was added portionwise to the mixture, kneading was conducted with a multi-purpose blender, T.K. HIVIS MIX f-model 03 ((registered trademark) produced by PRIMIX Corporation) for 90 minutes. To this solution, SBR-dispersed water BM-400B was added such that SBR solid content was 1.5 mass %, and kneading was conducted for 1 hour. The final viscosity of this solution was 4600 mPa·sec.

By using the thus obtained anode composition for lithium secondary battery, an anode for lithium secondary battery was prepared according to the aforementioned "Preparation of anode" method.

Figure 7:
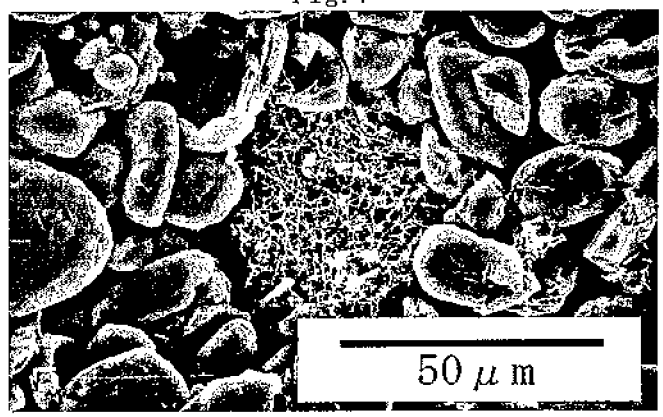
FIG. 7 is an SEM image of the anode material for lithium secondary battery (before pressing) in Comparative Example 1.
Figure 8:
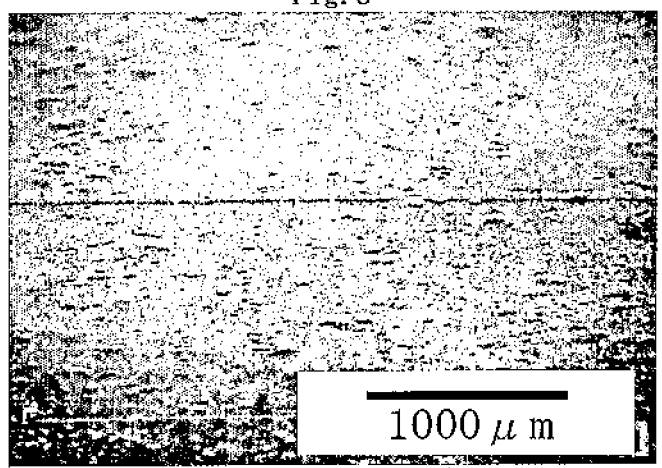
FIG. 8 is an SEM image of the anode for lithium secondary battery (after pressing) in Comparative Example 1.
Figure 9:
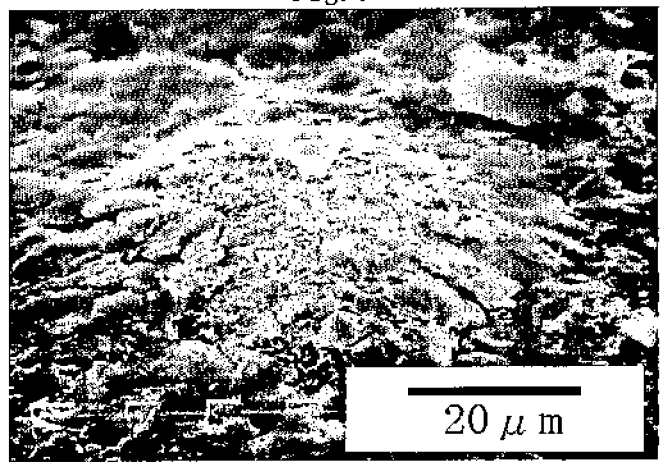
FIG. 9 is a magnified image of convex portion in FIG. 8.

FIG. 7 shows a magnified SEM image of the state of the anode material before pressing, and FIG. 8 shows an SEM image of the state of the anode surface after pressing. As understood from FIG. 7, carbon fiber present in the anode material as observed are agglomerated, and on the post-pressing anode surface shown by FIG. 8, there are prominently many convexes. A magnified image of a convex portion is shown in FIG. 9. From FIG. 9, it can be understood that such a convex is an agglomerate of carbon fiber, having a diameter of about 20 µm.

Comparative Example 2

As a 1 mass % aqueous solution of CMC prepared in advance was added portionwise to 20 g of VGCF, kneading was conducted with a multi-purpose blender, T.K. HIVIS MIX f-model 03 ((registered trademark) produced by PRIMIX Corporation) for 90 minutes, to thereby obtain a carbon-fiber containing composition having a VGCF concentration of 25 mass %. The viscosity of the solution was 12000 mPa·sec.

As a 1 mass % aqueous solution of CMC prepared in advance was added portionwise to 70 g of spherical natural graphite LB-CG, kneading was conducted with T.K. HIVIS MIX f-model 03 (registered trademark) for 2 hours, to thereby prepare a CMC solution having a spherical natural graphite LB-CG concentration of 50 mass %. To this solution, SBR-dispersed water BM-400B was added such that SBR solid content was 1.5 mass %, and kneading was conducted for 1 hour. The final viscosity of this thickening agent solution containing anode material was 3500 mPa·sec.

Subsequently, the carbon fiber-containing composition and the thickening agent solution containing anode material were mixed together so that the VGCF content was 2 mass %, assuming that the sum total amount of LB-CG, VGCF, SBR and CMC was 100 mass %, and the mixture was stirred for 15 minutes.

By using the thus obtained anode composition for lithium secondary battery, an anode for lithium secondary battery was prepared according to the aforementioned "Preparation of anode" method.

The obtained anode was observed by using an scanning electronic microscope, carbon fiber was present in agglomerated state in the anode material and many agglomerates of carbon fiber having a diameter exceeding 20 µm were scattered over the anode surface after pressing.

Comparative Example 3

As a 1 mass % aqueous solution of CMC prepared in advance was added portionwise to 20 g of VGCF, kneading was conducted with a multi-purpose blender, T.K. HIVIS MIX f-model 03 ((registered trademark) produced by PRIMIX Corporation) for 90 minutes, to thereby obtain a carbon-fiber containing composition having a VGCF concentration of 8.5 mass %. The viscosity of the solution was 4000 mPa·sec.

As a 1 mass % aqueous solution of CMC prepared in advance was added portionwise to 70 g of spherical natural graphite LB-CG, kneading was conducted with T.K. HIVIS MIX f-model 03 (registered trademark) for 2 hours, to thereby prepare a CMC solution having a spherical natural graphite LB-CG concentration of 60 mass %. To this solution, SBR-dispersed water BM-400B was added such that SBR solid content was 1.5 mass %, and kneading was conducted for 1 hour. The final viscosity of this thickening agent solution containing anode material was 10000 mPa·sec.

Subsequently, the carbon fiber-containing composition and the thickening agent solution containing anode material were mixed together so that the VGCF content was 2 mass % assuming that the sum total amount of LB-CG, VGCF, SBR and CMC was 100 mass % and the mixture was kneaded for 15 minutes.

By using the thus obtained anode composition for lithium secondary battery, an anode for lithium secondary battery was prepared according to the aforementioned "Preparation of anode" method.

The obtained anode was observed by using an scanning electron microscope, carbon fiber was present in agglomerated state in the anode material and many agglomerates of carbon fiber having a diameter exceeding 20 μm were scattered over the anode surface after pressing.

Comparative Example 4

As an 1 mass % aqueous solution of CMC prepared in advance was added portionwise to 20 g of VGCF, kneading was conducted with a multi-purpose blender, T.K. HIVIS MIX f-model 03 ((registered trademark) produced by PRIMIX Corporation) for 90 minutes, to thereby obtain a carbon-fiber containing composition having a VGCF concentration of 8.5 mass %. The viscosity of the solution was 4000 mPa·sec.

As carbon fiber-containing composition was added to 70 g of spherical natural graphite LB-CG such that the VGCF concentration became 2 mass %. Kneading was conducted with T.K. HIVIS MIX f-model 03 (registered trademark) for 2 hours. On this occasion, 1 mass % CMC solution was further added thereto for the purpose of adjusting viscosity. Next, to this solution, SBR-dispersed water BM-400B was added such that SBR solid content was 1.5 mass %, and kneading was conducted for 1 hour. The viscosity of this anode composition for lithium secondary battery composition was 4000 mPa·sec.

By using the thus obtained anode composition for lithium secondary battery, an anode for lithium secondary battery was prepared according to the aforementioned "Preparation of anode" method.

The obtained anode was observed by using an scanning electron microscope, carbon fiber was present in agglomerated state in the anode material and many agglomerates of carbon fiber having a diameter exceeding 20 μm were scattered over the anode surface after pressing.

Comparative Example 5

As a 1 mass % aqueous solution of CMC prepared in advance was added portionwise to 70 g of spherical natural graphite LB-CG, kneading was conducted with T.K. HIVIS MIX f-model 03 (registered trademark) for 2 hours, to thereby prepare a CMC solution having a spherical natural graphite LB-CG concentration of 50 mass %.

VGCF was added thereto and as 1 mass % CMC solution was portionwise added thereto for the purpose of adjusting viscosity, kneading was conducted for 2 hours. Next, to this solution, SBR-dispersed water BM-400B was added such that SBR solid content was 1.5 mass %, and kneading was conducted for 1 hour. The viscosity of this anode composition for lithium secondary battery composition was 4000 mPa·sec.

By using the thus obtained anode composition for lithium secondary battery, an anode for lithium secondary battery was prepared according to the aforementioned "Preparation of anode" method.

The obtained anode was observed by using an scanning electron microscope, carbon fiber was present in agglomerated state in the anode material and many agglomerates of carbon fiber having a diameter exceeding 20 μm were scattered over the anode surface after pressing.

Comparative Example 6

KF-polymer was added to spherical artificial graphite MCMB (25-28) and kneading was conducted with T.K. HIVIS MIX f-model 03 (registered trademark) for 15 hours. Then VGCF was added to the mixture and further kneading was conducted. The addition was conducted after calculation, such that the mass ratio between MCMB, VGCF and PVDF became 93:2:5.

Subsequently, as NMP was added thereto portionwise, viscosity of the anode composition was adjusted. By using the thus obtained anode composition for lithium secondary battery, an anode for lithium secondary battery was prepared according to the aforementioned "Preparation of anode" method.

Figure 10:
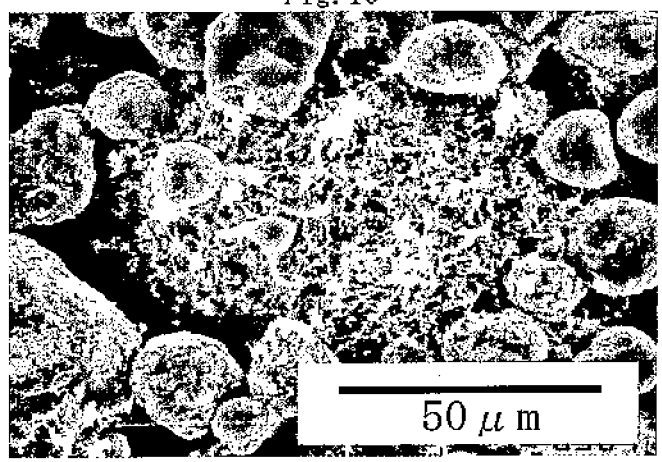
FIG. 10 is an SEM image of the anode material for lithium secondary battery (before pressing) in Comparative Example 6.

FIG. 10 shows a magnified SEM image of the state of the anode material before pressing. As apparent from FIG. 10, carbon fiber present in the anode material as observed were agglomerated, and there were many carbon fiber agglomerates having a diameter exceeding 20 μm, scattered over the post-pressing anode surface.

Comparative Example 7

KF-polymer was added to VGCF and kneading was conducted with T.K. HIVIS MIX f-model 03 (registered trademark) for 15 hours. Then spherical artificial graphite MCMB (25-28) was added to the mixture and further kneading was conducted. The addition was conducted after calculation, such that the mass ratio between MCMB, VGCF and PVDF became 93:2:5.

Subsequently, as NMP was added thereto portionwise, viscosity of the anode composition was adjusted. By using the thus obtained anode composition for lithium secondary battery, an anode for lithium secondary battery was prepared according to the aforementioned "Preparation of anode" method.

The obtained anode was observed by using an scanning electron microscope, carbon fiber was present in agglomerated state in the anode material and many agglomerates of carbon fiber having a diameter exceeding 20 μm were scattered over the anode surface after pressing.

Comparative Example 8

As a 1 mass % CMC solution prepared in advance was added portionwise to 70 g of spherical natural graphite LB-CG, kneading was conducted with T.K. HIVIS MIX f-model 03 (registered trademark) for 2 hours, to thereby prepare a CMC solution containing 50 mass % of spherical natural graphite LB-CG. Next, to this solution, SBR-dispersed water BM-400B was added such that SBR solid content was 1.5 mass %, and kneading was conducted for 1 hour. The viscosity of the CMC solution was 3500 mPa·sec.

By using the thus obtained anode composition for lithium secondary battery, an anode for lithium secondary battery was prepared according to the aforementioned "Preparation of anode" method.

Comparative Example 9

As a 1 mass % CMC solution prepared in advance was added portionwise to 70 g of massive artificial graphite SCMG-A, kneading was conducted with T.K. HIVIS MIX f-model 03 (registered trademark) for 2 hours, to thereby prepare a CMC solution containing 60 mass % of massive artificial graphite SCMG-A. Next, to this solution, SBR-dispersed water BM-400B was added such that SBR solid content was 1.5 mass %, and kneading was conducted for 1 hour. The viscosity of the CMC solution was 3000 mPa·sec.

By using the thus obtained anode composition for lithium secondary battery, an anode for lithium secondary battery was prepared according to the aforementioned "Preparation of anode" method.

Comparative Example 10

KF-polymer was added to spherical artificial graphite MCMB (25-28) and kneading was conducted with T.K. HIVIS MIX f-model 03 (registered trademark) for 15 hours. The addition was conducted after calculation, such that the mass ratio of MCMB (25-28) to PVDF became 93:5.

Subsequently, as NMP was added thereto portionwise, viscosity of the anode composition was adjusted. By using the thus obtained anode composition for lithium secondary battery, an anode for lithium secondary battery was prepared according to the aforementioned "Preparation of anode" method.

TABLE 1

Results of battery characteristics evaluation

|  | high-rate discharge capacity retention ratio (%) | cycle discharge capacity retention ratio (%) |
|---|---|---|
| Example-1 | 97.2 | 75 |
| Example-2 | 95.0 | 78 |
| Example-3 | 98.2 | 80 |
| Example-4 | 97.2 | 76 |
| Example-5 | 97.0 | 75 |
| Example-6 | 97.3 | 73 |
| Example-7 | 95.1 | 74 |
| Comparative Example-1 | 79.1 | 45 |
| Comparative Example-2 | 78.0 | 43 |
| Comparative Example-3 | 77.9 | 39 |
| Comparative Example-4 | 78.2 | 42 |
| Comparative Example-5 | 77.4 | 46 |
| Comparative Example-6 | 73.3 | 43 |
| Comparative Example-7 | 74.6 | 41 |
| Comparative Example-8 | 83.2 | 20 |
| Comparative Example-9 | 90.0 | 60 |
| Comparative Example-10 | 75.0 | 48 |

INDUSTRIAL APPLICABILITY

The invention is applicable in any lithium secondary battery having any shape and any type and the lithium secondary battery can be used as power source of cellular phones or mobile electronic instruments, as a battery for automobile or a battery for electric power tool.

The invention claimed is:

1. A carbon fiber-containing composition, comprising a vapor grown carbon fiber and an aqueous solution of a thickening agent, wherein the vapor grown carbon fiber has an average fiber diameter of 1 to 200 nm with a hollow structure inside the fiber and a structure where graphene sheets are laminated vertically against the length direction of the fiber,
wherein d(002), a planar spacing between (002) faces, is from 0.336 to 0.345 nm in the graphite structure as measured by powder X-ray diffraction method,
wherein the vapor grown carbon fiber is dispersed in the aqueous solution of thickening agent,
wherein the viscosity of the carbon fiber-containing composition at 25° C. is 5000 mPa·sec or lower, and
wherein the concentration of the vapor grown carbon fiber in the composition is within a range of 1 to 20 mass % and the solid concentration of the aqueous solution of thickening agent is within a range of 0.3 to 3.0 mass %.

2. The carbon fiber-containing composition according to claim 1, wherein the vapor grown carbon fiber has an average aspect ratio of 20 to 2000.

3. The carbon fiber-containing composition according to claim 1, wherein the vapor grown carbon fiber has branched portions.

4. The carbon fiber-containing composition according to claim 1, wherein the aqueous solution of thickening agent is an aqueous solution of carboxymethyl cellulose thickening agent.

5. A method for producing an anode composition for lithium secondary battery, comprising mixing an anode-material-containing aqueous solution of a thickening agent which solution contains an anode active material which uses natural graphite or artificial graphite having d(002) of 0.335 to 0.337 nm in the graphite structure as measured by powder X-ray diffraction method and can absorb, store and discharge lithium, a thickening agent solution and water having styrene butadiene rubber dispersed therein and a carbon fiber-containing composition as claimed in claim 1 by stirring.

6. The production method according to claim 5 wherein the thickening agent solution is an aqueous solution of carboxymethyl cellulose thickening agent.

7. The carbon fiber-containing composition according to claim 1, wherein the thickening agent is at least one selected from the group consisting of polyethylene glycol, cellulose, polyacrylamide, poly-N-vinylamide and poly-N-vinylpyrrolidone.

8. The carbon fiber-containing composition according to claim 1, wherein the viscosity of the carbon fiber-containing composition at 25° C. is 2000 to 5000 mPa·sec.

* * * * *